Sept. 16, 1952      E. L. BARCUS      2,611,047

DIRECTION SIGNALING DEVICE

Filed June 8, 1950

Inventor
Edward L. Barcus

By
Willits, Helwig & Baillio
Attorneys

Patented Sept. 16, 1952

2,611,047

UNITED STATES PATENT OFFICE 2,611,047

DIRECTION SIGNALING DEVICE

Edward L. Barcus, Anderson, Ind., assignor to General Motors Corporation, Detroit, Mich., a corporation of Delaware Application June 8, 1950, Serial No. 166,878

11 Claims. (Cl. 200—59)

1

The present invention relates to direction signaling devices for automotive vehicles and more particularly to signaling devices of the type disclosed in my application Serial No. 131,606, filed December 7, 1949, and assigned to the assignee of the present invention.

An object of the invention is to provide an improved signaling device so constructed and arranged as to provide for the manual setting of the device to energize a signaling circuit and the automatic resetting of the device to a neutral position after a predetermined angular movement of the steering mechanism.

This and other objects are attained in accordance with the present invention by providing a direction signaling device with a manually settable operating mechanism having means adapted to frictionally engage the hub of a steering wheel to reset the mechanism after a predetermined angular movement of the steering wheel.

Figure 1:
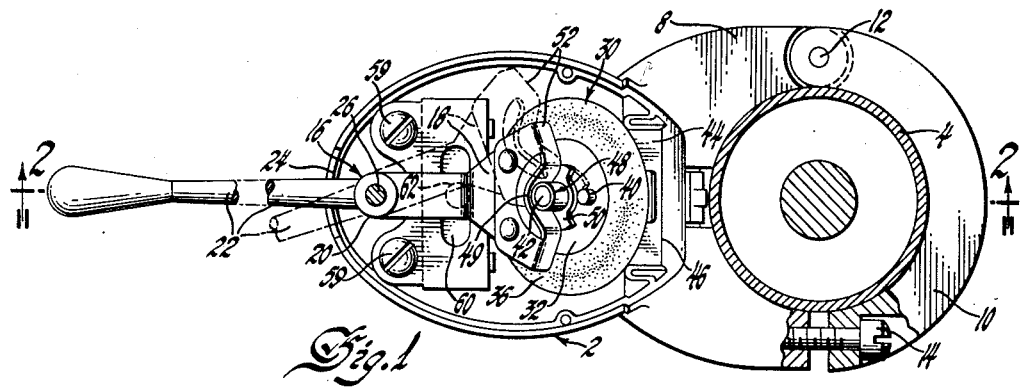
Figure 2:
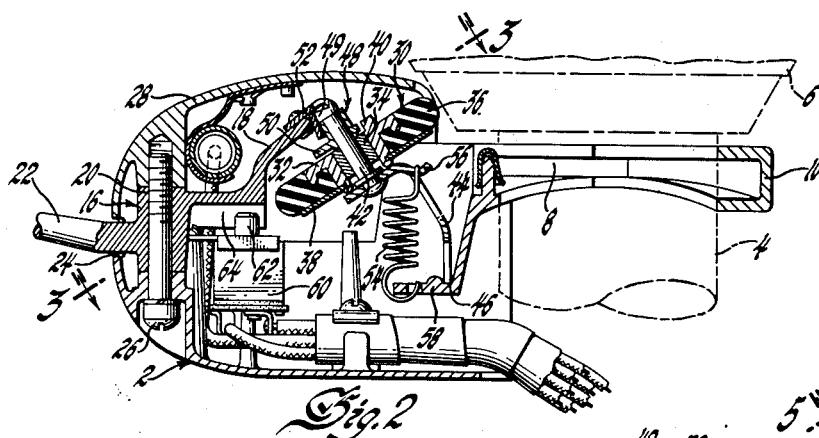
Figure 3:
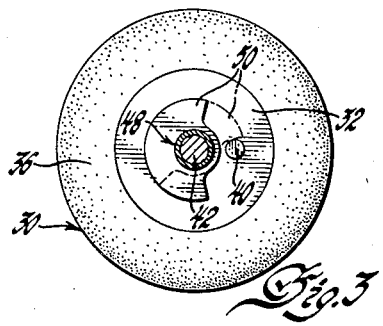
Figure 4:
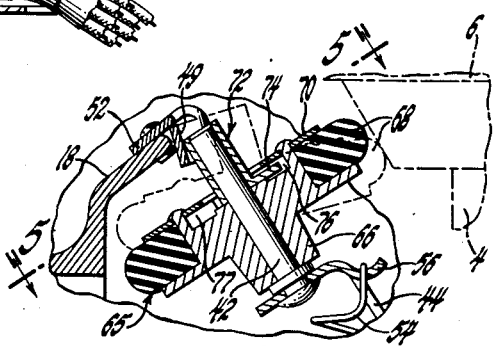
Figure 5:
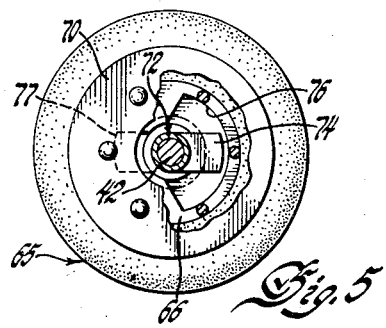
Figure 6:
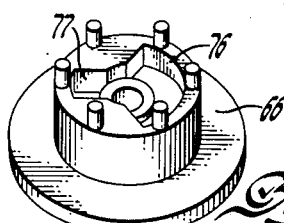

For a better understanding of the invention reference may be had to the accompanying drawing in which Figure 1 is a top plan view of the signaling device mounted on the steering column of a vehicle with the cover of the device removed; Figure 2 is an elevational view in cross section of the device mounted on the steering column adjacent the steering wheel of a vehicle; Figure 3 is a fragmentary view of the device taken along the line 3—3 of Figure 2; Figure 4 is a fragmentary view similar to Figure 2 illustrating a modification of the present invention; Figure 5 is a fragmentary view taken along the line 5—5 of Figure 4 and Figure 6 is a detail perspective view of the hub of the modification illustrated in Figures 4 and 5.

Referring now to the drawing and particularly to Figures 1 and 2, there is illustrated a signaling device embodying the present invention in which the operating mechanism is enclosed in a housing 2 adapted to be attached to the steering column 4 adjacent the steering wheel 6 of an automotive vehicle. The housing 2 is formed with an integral split ring clamp consisting of the yoke member 8 to which there is attached a cooperating clamping arm 10 hinged at 12. With this form of housing it is readily attachable to the steering column 4 of a vehicle by swinging the arm 10 outwardly, placing the yoke in engagement with the surface of the steering column and thereafter clamping the housing to the steering column with a threaded member 14 as shown. Positioned within the housing is a die cast operating member 16 comprising a cam segment 18, a hub 20 and an operating lever 22

2 which extends outwardly of the housing through an opening 24. The operating lever 16 is rotatably mounted on a partly threaded member 26 which also serves to secure a housing cap 28 to the housing, as shown.

To effect an automatic return of the operating member 16 to its neutral position from either of its operating positions, a friction wheel 30 is provided in the housing. The wheel comprises a hub 32 mounted on a journal bushing 34 and an annular ring 36 of suitable resilient material such, for example, as rubber or the like. The ring 36 is secured to the hub by a washer 38 which is attached to the hub by spreading a portion of the hub over the washer, as shown. To effect a suitable frictional engagement between the hub 32 and the ring 36, the hub is provided with an inwardly extending axial flange which seats in a cooperating annular recess in the ring, as shown in Figure 2. Extending axially and outwardly of the hub 32 is a pin or hub projection 40.

The friction wheel 30 is mounted for rotation on a pin 42 extending upwardly from a pivot plate 44 having its lower end recessed in a slot 46 formed in the housing. A bushing 48 is also mounted on pin 42 with one end slidably engaging the upper end of journal bushing 34. Bushing 48 is provided with a flange 50, see Figure 3, which extends around the bushing through substantially 180° as shown. With bushing 48 and wheel 30 positioned on pin 42 the bushing 48 may be rotated relatively to the wheel 30 until the ends of the flange engage the pin 40, thus forming a lost motion connection between the wheel and the bushing. Further, the bushing is in frictional engagement with a camming plate 52 secured to the cam segment 18 by any suitable means such as rivets. The camming plate is of a metal adapted to be heat-treated to provide a hard wearing surface for engaging the bushing 48 and is formed with a camming recess 49. The bushing 48 is yieldingly urged into engagement with the camming plate 52 by a spring 54 which has one end connected to an ear 56 pressed outwardly from the pivot plate and the other end is connected to a flange 58 extending inwardly from the housing 2.

Secured within the housing by threaded members 59 is a double throw multi-pole electrical switch 60 such as that disclosed in my copending application Serial No. 123,036, filed October 22, 1949 and assigned to the assignee of the present application. The switch has its operating arm 62 recessed in a slot 64, formed in the operating member 16 and is adapted for connection to a plurality of direction indicating signaling circuits to indicate right and left turns.

A modified form of friction wheel 65 is illustrated in Figures 4, 5 and 6 and comprises a hub 66 adapted for mounting on pin 42. Extending around the periphery of hub 66 is an annular ring 68 of resilient material which is clamped to the hub by an annular washer 70. A bushing 72 having a radially extending lug 74 is positioned on pin 42 adjacent the hub 66 with the lug 74 extending into a segmental groove 76 extending angularly a predetermined distance around the axis of the hub and formed by a cooperating inner edge of the washer 70 with the hub 66. A recessed slot 77 is also formed in the hub 66 by the cooperation of hub 66 and washer 70 and is also adapted to receive the lug 74 of bushing 72. With this arrangement of the friction wheel and the bushing 72, the bushing may be positioned with its lug 74 extending into slot 77 to prevent relative rotary movement of the hub and resilient ring with respect to the bushing or it may be positioned with the lug extending into the segmental groove 76 to permit limited relative movement of the bushing on the hub.

In the operation of the direction signaling device hereinabove described, a counterclockwise rotation of operating member 16 to the dotted line position of Figure 1 urges the bushings 48 or 72 out of camming recess 49 against the pressure of spring 54 and into engagement with one of the surfaces of the camming plate adjacent the camming recess. Simultaneously, the peripheral edge of the wheel 30 or 65 is forced into engagement with the hub of the steering wheel 6 and the switch 60 through its switch arm 62 is positioned to provide a predetermined signaling circuit electrical connection. With a counterclockwise rotation of the steering wheel 6, either wheel 30 or 65 rotates in a clockwise direction on pin 42 until hub projection 40 or the end edge of segmental groove 76 is engaged by the lug 50 or 74 respectively. With such engagement the bushing 48 or 72 rotates in a clockwise direction with the friction wheel, sliding on the surface of the camming plate 52 without imparting movement to the operating member 16. Because of the relative motion between the bushing and wheel, slipping and consequent wear on the camming plate surface is reduced. Upon reversal of direction of rotation of the steering wheel, the direction of rotation of the wheel 30 or 65 is likewise reversed and the wheels move relatively with respect to bushings 48 and 72 until the lugs of the respective bushings engage the pin 40 or the opposite end of groove 76. Thereafter, the bushings rotate with the wheels and the frictional engagement between the bushings and the camming plate causes the operating member to be returned in a clockwise direction to its neutral position with the bushings being urged into the camming recess to permit disengagement of the wheel from the hub of the steering wheel. During the return of operating member 16 to its neutral position there is a corresponding movement of the switch arm 62 and a return of the switch to its neutral position.

From the description of operation of the device for a counterclockwise rotation of operating member 16 corresponding to a left turn, it will be obvious that to provide a right turn indication the operation of all parts of the mechanism will be substantially the same but reversed.

A direction signaling device such as that above described is particularly desirable since it permits of a construction utilizing a friction wheel assembly to accomplish a return of the device to a neutral position and with the friction wheel of my invention a wheel of substantially small diameter may be utilized thereby reducing the size of the device. Further it permits a design adapted to accomplish a resetting operation upon a predetermined angular movement of the steering wheel. Still further, this invention permits utilization of the direction signaling device on vehicles having steering wheels of different hub diameters.

What I claim as new and desire to secure by Letters Patent of the United States is:

1. A direction signaling device comprising a support, a wheel pivotally and rotatably mounted on said support, a bushing pivotally mounted on said support adjacent said wheel, means for allowing relative rotation between said wheel and said bushing throughout a predetermined angular distance, an operating member pivotally mounted on said support, said member having a cam segment engaging said bushing for pivotally moving said wheel and bushing on said support and an electrical switch mounted on said support for actuation by said operating member.

2. In a direction signaling device having a support, an operating member with a cam segment pivotally mounted on said support and an electrical switch actuated by said member, a wheel pivotally and rotatably mounted on said support and a bushing mounted in axial alignment with said wheel engaging said cam segment, said bushing being pivotally movable with said wheel in response to actuation of said operating member and rotatable relative thereto throughout a predetermined angular distance.

3. In a direction signaling device having a support, an operating member having a cam segment pivotally mounted on said support and an electrical switch actuated by said member, a wheel pivotally and rotatably mounted on said support, a bushing mounted in axial alignment with said wheel and in engagement with said cam segment, said bushing and wheel being relatively rotatable through a lost motion connection and pivotally movable in response to actuation of said operating member.

4. A direction signaling device comprising a support, a wheel pivotally and rotatably mounted on said support, a bushing pivotally mounted on said support adjacent said wheel and rotatable relatively thereto, lost motion means connecting said bushing and wheel for the relative rotation therebetween, an operating member having a cam segment pivotally mounted on said support with said cam segment in engagement with said bushing for pivotally moving said bushing and wheel in response to actuation of said operating member and an electrical switch mounted on said support for actuation by said operating member.

5. In a direction signaling device, a housing, an operating member pivotally supported in said housing, said member being provided with a cam segment, an electrical switch mounted in said housing for actuation by said member, a wheel pivotally and rotatably supported in said housing, a bushing mounted in said housing in axial alignment with said wheel to engage said cam segment, said bushing being pivotally movable with said wheel in response to actuation of said operating member and lost motion means connecting said bushing and wheel to permit relative rotation throughout a predetermined angular distance.

6. In a direction signaling device, a housing, an operating member supported in said housing for limited rotary movement therein, said member being provided with a cam segment, an electrical switch mounted in said housing for actuation by said member, a friction wheel pivotally and rotatably supported in said housing, said wheel having a pin extending axially thereof, a bushing mounted in said housing in axial alignment with said wheel to engage said cam segment, said bushing being pivotally movable with said wheel in response to actuation of said operating member and having a radially extending flange segment adapted to engage said pin to permit relative rotation of said bushing on said wheel throughout a predetermined angular distance.

7. In a direction signaling device, a housing, an operating member supported in said housing for limited rotary movement therein, said member being provided with a cam segment, an electrical switch mounted in said housing for actuation by said operating member, a friction wheel pivotally and rotatably supported in said housing, said wheel having a slot in one end thereof extending through a predetermined angular distance about the axis of said wheel, a bushing mounted in said housing in axial alignment with said wheel to engage said cam segment, said bushing being pivotally movable with said wheel in response to actuation of said operating member and having a radially extending lug adapted to be recessed in said slot to provide relative angular rotation of said bushing on said wheel throughout a predetermined angle.

8. In an automotive vehicle having a rotatable steering wheel with a hub and a support for said wheel, a direction signaling device comprising a housing attached to said support adjacent said hub, an operating member mounted for rotation in said housing, said member having a cam segment, an electrical switch mounted in said housing for actuation by said member, a wheel mounted for rotation in said housing, said wheel being laterally movable in said housing into and out of engagement with said hub, and a bushing mounted adjacent said wheel for engagement with said cam segment and movement laterally with said wheel in response to rotation of said operating member, said bushing being rotatable relatively to said wheel throughout a predetermined angular distance.

9. In an automotive vehicle turning signal, a rotary element actuable with the vehicle steering mechanism, a manually operable signaling member, an electrical switching means actuable by said member when moved to signaling position, a wheel, a support for said wheel mounted for pivotal movement toward and from said rotary element, a camming means actuable by said signaling member when moved to signaling position to move said wheel into rotative engagement with said rotary element, and a rotatable connecting member actuable by said wheel and engaging said camming means to import movement thereto toward non-signaling position when rotated by said wheel, said connecting member and said wheel having interengaging clutching means permitting limited rotation of said wheel before imparting rotation to said connecting member.

10. In a direction signaling device comprising a support, a wheel rotatably and displaceably mounted on said support, a bushing displaceably mounted on said support adjacent said wheel and rotatable relatively thereto throughout a predetermined angular distance, an operating member mounted on said support, said member having a cam segment for engaging said bushing and displacing said wheel and bushing on said support and an electrical switch mounted on said support for actuation by said operating member.

11. A direction signaling device comprising a support, a first rotatable member displaceably mounted on said support, a second rotatable member mounted on said support for displacement with said first member, interengaging clutching means connecting said first and second members and permitting limited relative rotation between said members, an operating member mounted on said support, camming means engaging one of said members and actuable by said operating member to displace said members on said support and an electrical switch actuable by said operating member.

EDWARD L. BARCUS.

REFERENCES CITED

The following references are of record in the file of this patent:

UNITED STATES PATENTS

| Number | Name | Date |
| --- | --- | --- |
| 2,034,414 | Pagendarm | Mar. 17, 1936 |
| 2,308,108 | Roedding | Jan. 12, 1943 |